United States Patent

[11] 3,581,722

| [72] | Inventor | Malcolm R. McKellar<br>Bloomfield, Mich. |
|---|---|---|
| [21] | Appl. No. | 873,473 |
| [22] | Filed | Nov. 3, 1969 |
| [45] | Patented | June 1, 1971 |
| [73] | Assignee | General Motors Corporation<br>Detroit, Mich. |

[54] INTERNAL COMBUSTION ENGINE WITH INDUCTION AIR HEATING MEANS
7 Claims, 6 Drawing Figs.

[52] U.S. Cl................................................. 123/122,
123/52, 123/55
[51] Int. Cl...................................................... F02m 35/04,
F02m 31/04, F02m 31/14
[50] Field of Search............................................ 123/122,
122 D, 122 A, B, C, 52, 52 MV, 127

[56] References Cited
UNITED STATES PATENTS

| 2,264,133 | 11/1941 | Funderburk.................. | 123/122(D) |
| 2,941,521 | 6/1960 | Rarey et al.................... | 123/52(MV)X |
| 3,085,558 | 4/1963 | Sarto........................... | 123/122 |
| 3,450,119 | 6/1969 | Sendelbach.................. | 123/122(D) |

*Primary Examiner*—Al Lawrence Smith
*Attorneys*—J. L. Carpenter and Robert J. Outland

ABSTRACT: A vee-type internal combustion engine is provided with an aluminum intake manifold conventionally disposed between the engine cylinder banks. The manifold excludes the usual exhaust gas passage to permit high output operation without heating for maximum volumetric efficiency. Induction air heating is provided when necessary by a first exhaust heat stove disposed under the manifold and extending between the banks and a second exhaust heat stove conventionally mounted on one of the exhaust manifolds. Both heat stoves include means for delivering heated air to the engine air cleaner for delivery to the engine carburetor and inlet manifold.

INVENTOR.
Malcolm R. McKellar
BY
Robert F. Outland
ATTORNEY

INVENTOR.
Malcolm R. McKellar
BY
Robert J. Outland
ATTORNEY 3,581,722

INTERNAL COMBUSTION ENGINE WITH INDUCTION AIR HEATING MEANS

FIELD OF THE INVENTION

This invention relates to internal combustion engines and, more particularly to improved arrangements for heating the induction air of such engines, as may be necessary for proper vaporization of the fuel charge.

DESCRIPTION OF THE PRIOR ART

It is known in the art relating to internal combustion engines to provide means for heating the fuel-air mixture delivered to the engine in order to assure maintenance of the fuel in an adequately vaporized condition during its passage through the engine inlet manifold. One common means of accomplishing this purpose is to provide an exhaust gas passage in the inlet manifold arranged in heat exchange relation to the passages carrying the inlet gas charge so that the charge is heated by the exhaust gases. Another method of heating charge, which may be used either alternately or in addition to the foregoing, is to provide a stove arrangement in conjunction with the engine exhaust manifold which is arranged so that the engine inlet air may be drawn through the stove and heated before it is passed through the carburetor to form the inlet charge. A temperature-controlled valve is generally provided to shut off the flow of heated air to the carburetor when a desired engine-operating temperature has been reached and to thereafter direct air at ambient temperature into the carburetor inlet. The latter arrangement is now in common use to provide heating during the engine warmup period.

While the use of an inlet manifold incorporating an exhaust crossover provides satisfactory operation in many cases, it has the drawback of, to some extent, heating the charge under all conditions so that the manifold volumetric flow is somewhat reduced from the maximum which would otherwise be possible. Thus, in order to operate an engine at maximum output, it is desirable to avoid the use of manifold heat under high output conditions.

SUMMARY OF THE INVENTION

The present invention provides an improved arrangement for heating, as necessary, the induction air of an internal combustion engine while avoiding the unnecessary application of heat to the charge at higher engine outputs, thereby obtaining maximum volumetric efficiency of the inlet manifold. The arrangement is such as to efficiently utilize the space available between the banks of a vee-shaped engine to locate an induction air exhaust heat stove which is completely separate from the inlet manifold and is shielded to avoid the undesired transfer of heat thereto. The inlet manifold, which may conveniently be formed of aluminum, excludes the usual exhaust heat passages and thus is not subject to undesired heating during high output operation.

The invention further includes the provision of a second exhaust heat stove conventionally mounted around one of the exhaust manifolds and arranged to provide an additional amount of heated air for induction into the engine in order to provide an adequate volume of heated air to obtain smooth operation during engine warmup. Further advantages and objects of the invention will be apparent from the following description of a preferred embodiment of the invention as disclosed in the accompanying drawings.

DESCRIPTION OF THE PREFERRED EMBODIMENT

Figure 1:
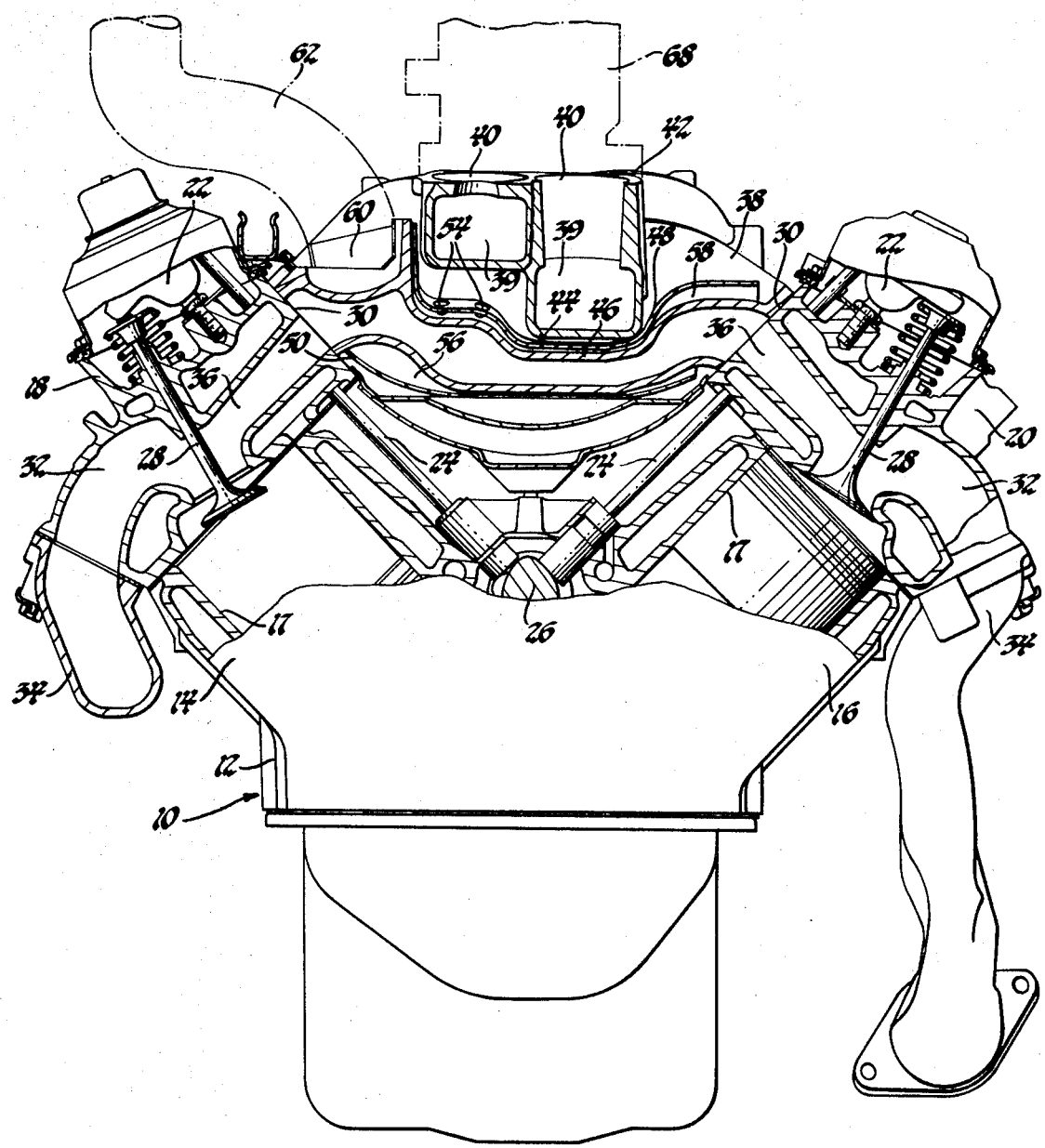
FIG. 1 is an end view partially in section showing an engine having induction air heating means according to the invention.
Figure 2:
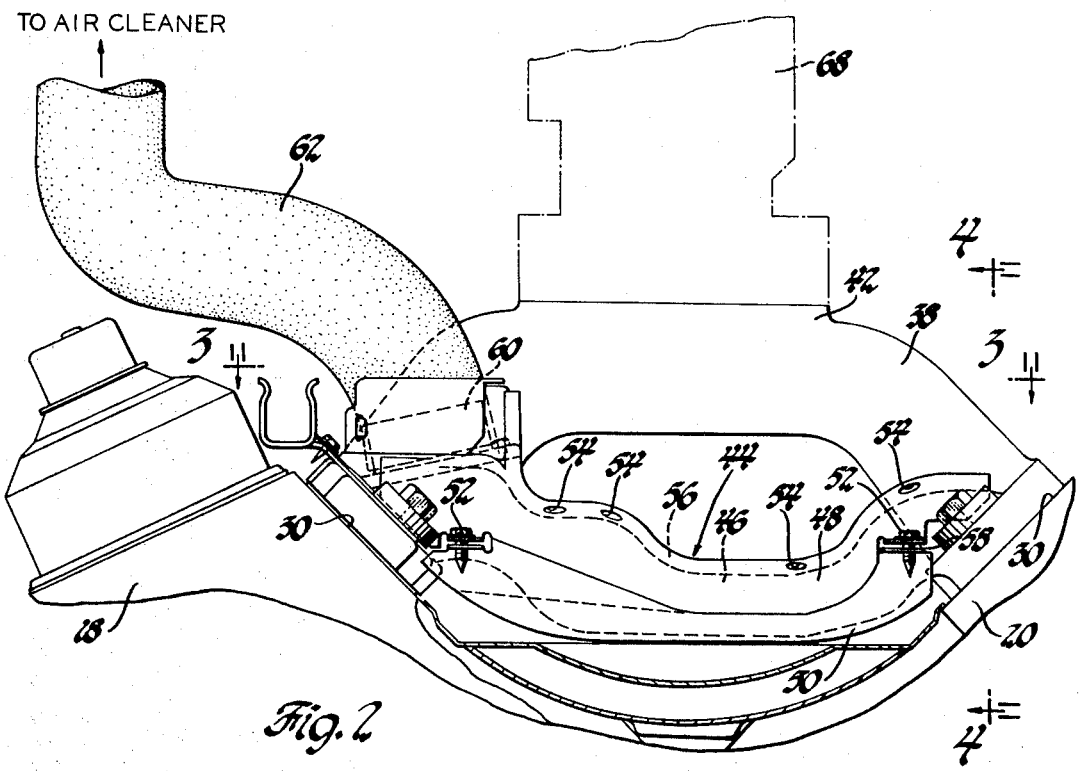
FIG. 2 is a fragmentary view of a portion of the engine of FIG. 1, showing the induction air heating means in greater detail.
Figure 3:
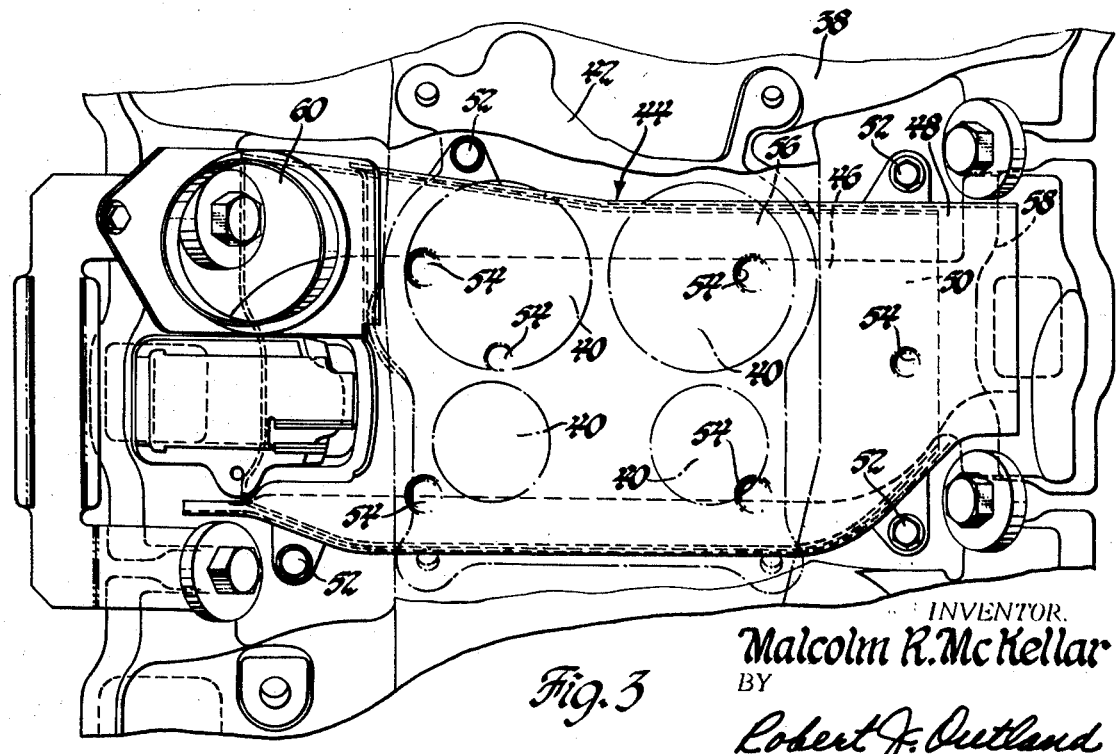
FIG. 3 is a view taken generally in the plane indicated by line 3–3 of FIG. 2 viewed in the direction of the arrows and having portions of the inlet manifold removed to further disclose the induction air heating means.
Figure 4:
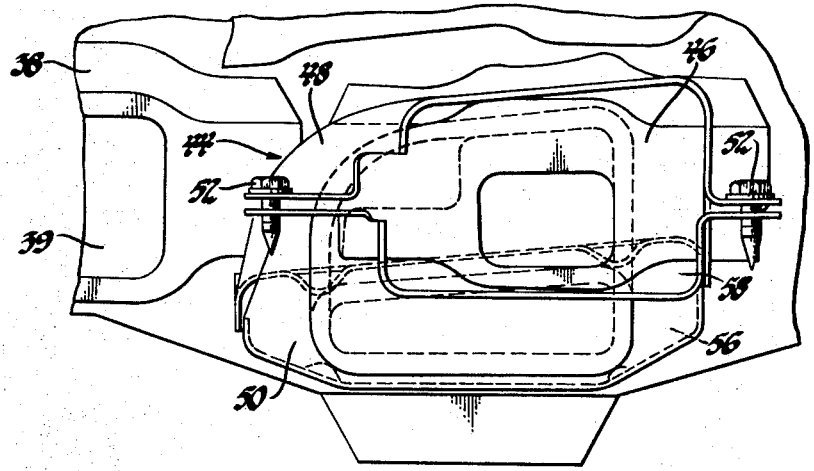
FIG. 4 is a cross-sectional view taken generally in the plane indicated by the line 4–4 of FIG. 2 viewed in the direction of the arrows and disclosing further details of the air heating means.

In the drawings, numeral 10 generally indicates an internal combustion engine having a cylinder block 12 including a pair of angularly disposed banks 14 and 16 of longitudinally aligned cylinders 17, the banks being arranged in the conventional V configuration. On the outer ends of the cylinder banks are mounted conventional cylinder heads 18 and 20, carrying the usual rocker arms 22 movable by push rods 24 and driven by the camshaft 26 so as to actuate the valves 28 to control the inlet and exhaust of gases to and from the engine cylinders 17.

The cylinder heads include conventionally arranged inlet passages (not shown) opening through the inner surfaces 30 of the cylinder heads and adapted to conduct the fuel-air inlet charge to each of the cylinders. In addition, there are provided exhaust passages 32, which connect the cylinders with exhaust manifolds 34 mounted on the outer surfaces of the cylinder head.

The exhaust passages for the inboard cylinders of each bank, as shown in FIG. 1, include inward extensions 36, which extend transversely of the heads opening through the inner surfaces 30 thereof intermediate certain of the inlet passages. At this location it is conventional to secure a cast iron inlet manifold, including induction air passages connecting with the cylinder head inlet passages and an integral exhaust crossover passage connecting with the cylinder head exhaust passage extensions 36.

The present arrangement, however, differs from this conventional construction in providing a cast aluminum inlet manifold 38, which has no exhaust crossover passage but includes only passages 39 for carrying the inlet gas charge from inlet openings 40 provided in the carburetor mounting boss 42 to the various cylinder head inlet passages. The inlet manifold 38 is conventionally mounted on the inner surfaces 30 of the cylinder heads, bridging the upper end of the V formed by the angularly disposed cylinder banks 14, 16.

Beneath the inlet manifold and between the cylinder banks is located an induction air exhaust heat stove 44 having its ends secured to the inner surfaces 30 of the opposite cylinder heads 18, 20. The exhaust heat stove includes a cast iron crossover member 46 which connects with the exhaust passage extensions 36 of the two cylinder heads so as to permit exhaust gas flow between the cylinder heads through the crossover member. Surrounding the crossover member 46 is a radiation and flow shield made up of upper and lower sheet metal members 48 and 50, respectively, which are secured together by suitable means, such as screws 52.

A plurality of dimplelike indentations 54 are provided in the upper sheet metal member 48 to properly space the surfaces of the sheet metal shield away from those of the crossover member 46 so as to define an air flow passage 56. Passage 56 extends substantially the length of the crossover member from an inlet opening 58 at one end of the shield members 48, 50 to an outlet opening 60 provided in the upper member 48 at the opposite end thereof. Connecting means, such as tube 62, is arranged as best shown in FIG. 6 to connect the heat stove outlet 60 with the inlet 64 of an air cleaner support member 66, the latter being mounted upon the engine carburetor 68, which is in turn carried on the mounting boss 42 of the inlet manifold, as shown in FIG. 5.

Figure 5:
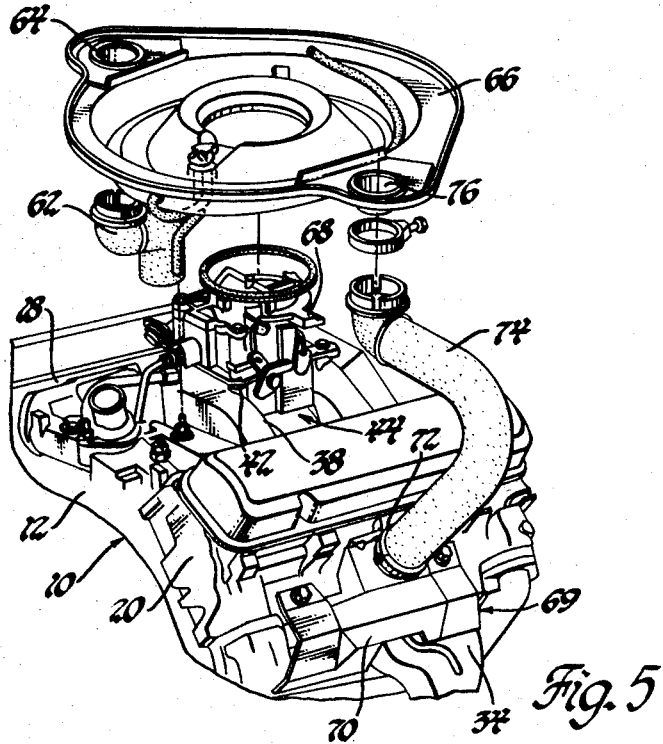
FIG. 5 is an exploded pictorial view of a portion of the engine of FIG. 1, disclosing the auxiliary induction air heating means and the manner of its connection with the air cleaner housing.
Figure 6:
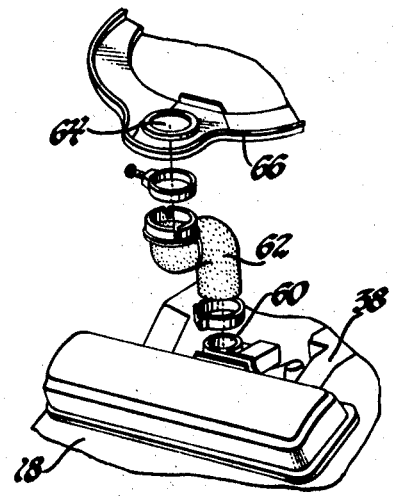
FIG. 6 is an exploded pictorial view showing a portion of the engine of FIG. 1, disclosing the manner of connecting the primary induction air heating means to the air cleaner housing.

As shown in FIG. 5, there is arranged along the side of the engine opposite the location of connecting hose 62 and outlet 60 an auxiliary exhaust heat stove 69 of conventional design, including a sheet metal cover 70, which surrounds a portion of the exhaust manifold 34 to provide a passage in heat exchange relation with the manifold through which air may be drawn into an outlet 72. Outlet 72 is in turn connected through means such as hose 74 to a second inlet 76 provided in the air cleaner support member 66. Suitable filtration and cover means (not shown) are arranged in any desired manner on the support member 66 which may include valved control means of the type currently in use to draw air into the air cleaner, either directly from the atmosphere or through either or both of the exhaust heat stove arrangements provided, depending upon the inlet air temperature desired.

In operation, engine exhaust gases flowing out of the exhaust manifolds 34 and through the crossover member 46 heat these members and transmit heat to air in the passages of the two heat stoves 44, 69 of which they form a part. During cold engine operation, induction air may be drawn through one or both of the heat stoves in which it is heated and thence directed into the air cleaner and through the carburetor. There it is mixed with and vaporizes the fuel and then passes through the inlet manifold to the engine cylinders in the usual manner. When the engine is sufficiently warmed up and it is desired to operate at high outputs, the flow from both heat stoves is cut off by means of conventional valving (not shown) and air is taken into the air cleaner directly through atmosphere so that no additional heat is provided to the inlet manifold. In this way, maximum volumetric efficiency of the manifold is obtained when this is possible without adversely affecting engine operation.

It is noted that the above-described arrangement takes advantage of the space beneath the inlet manifold to provide induction air heating means which occupy the space usually provided for integral manifold passages but avoids the undesired result of such passages; namely, that of heating the manifold at all times so as to unnecessarily reduce its volumetric efficiency. The metal shield members 48, 50, in addition to defining a flow passage for the heated induction air, also act as a radiation shield to prevent heat from the crossover member from being radiated directly to the induction manifold or to the other parts of the engine. The combination of this uniquely located heat stove with the additional conventionally mounted heat stove, provides adequate heating for all engine operating purposes without the use of the usual integral manifold exhaust crossover.

While the invention has been disclosed by the description of only a single preferred embodiment, it should be apparent that numerous changes could be made within the spirit and scope of the inventive concepts involved and the disclosure should be so understood.

I claim:
1. In combination with an internal combustion engine including a pair of angularly disposed banks of cylinders arranged in a V and having cylinder inlet and exhaust gas passages opening through said cylinder banks adjacent their outer ends,
   an inlet manifold bridging the open end of the V, said inlet manifold having at least one inlet opening and connecting with the cylinder inlet passages to deliver combustion air thereto and
   an exhaust heat stove separate from said manifold and extending thereunder between the cylinder banks, said heat stove including exhaust passage means joining exhaust passages of the two cylinder banks so as to permit a flow of exhaust gases therebetween and air passage means in heat exchange relation with said heat stove exhaust passage means, said air passage means being connectable with the inlet opening of said inlet manifold to provide for the delivery of heated air from said heat stove to said manifold.

2. The combination of claim 1 wherein said inlet manifold is formed of aluminum and said heat stove includes a radiation shield to prevent the transfer of excessive exhaust heat to the aluminum manifold.

3. The combination of claim 1 wherein said engine further includes
   exhaust manifolds disposed outboard of said cylinder banks and connecting with said exhaust gas passages to receive exhaust gases therefrom and
   a second heat stove formed in conjunction with one of said exhaust manifolds and defining an air passage in heat exchange relation with said one exhaust manifold, said air passage being connectable with the inlet opening of said inlet manifold to provide additional heated air thereto.

4. The combination of claim 3 wherein said inlet manifold is formed of aluminum and said first-named heat stove includes a radiation shield to prevent the transfer of excessive exhaust heat to the aluminum manifold.

5. In combination with an internal combustion engine including a pair of angularly disposed banks of cylinders arranged in a V and having cylinder inlet and exhaust gas passages opening through said cylinder banks adjacent their outer ends,
   an inlet manifold bridging the open end of the V, said inlet manifold having at least one inlet opening and connecting with the cylinder inlet passages to deliver combustion air thereto and
   an exhaust heat stove connectable with the inlet of said inlet manifold to provide heated air thereto, said heat stove comprising,
   an exhaust crossover member separate from said manifold and extending thereunder between the cylinder banks, said crossover member joining exhaust gas passages of the two cylinder banks so as to permit a flow of exhaust gases therebetween to heat the crossover member and
   a flow-directing shield spacedly disposed around said crossover member and defining an air passage having an inlet and outlet and disposed in heat exchange relation with said crossover member, said passage outlet being connectable with said inlet manifold inlet opening.

6. The combination of claim 5 wherein said flow-directing shield comprises a plurality of sheet metal members secured together so as to substantially surround said exhaust crossover member and including spacing means for maintaining said sheet metal members in spaced relation with said exhaust crossover member, said sheet metal members acting both to define a passage for air flow in heat exchange relation with said crossover member and to prevent the transfer by radiation of excessive heat from said crossover member to said inlet manifold and other portions of said engine.

7. The combination of claim 6 wherein said spacing means include dimplelike depressions spaced over the surface of certain of said sheet metal members and adapted to contact the surface of said exhaust crossover member so as to maintain the spaced relation of said members and damp undesired vibrations in said sheet metal members.